US007525480B2

(12) United States Patent
Sheu

(10) Patent No.: US 7,525,480 B2
(45) Date of Patent: Apr. 28, 2009

(54) DYNAMIC SPEED FINDING METHOD

(75) Inventor: Yih-Ran Sheu, Tainan County (TW)

(73) Assignee: Souther Taiwan University, Tainan County (TW)

( * ) Notice: Subject to any disclaimer, the term of this patent is extended or adjusted under 35 U.S.C. 154(b) by 0 days.

(21) Appl. No.: 11/854,025

(22) Filed: Sep. 12, 2007

(65) Prior Publication Data

US 2009/0066570 A1 Mar. 12, 2009

(51) Int. Cl.
*G01S 5/14* (2006.01)
*G01S 1/02* (2006.01)
*G01C 21/20* (2006.01)

(52) U.S. Cl. ............................ 342/357.08; 342/357.06; 342/357.13; 701/213

(58) Field of Classification Search ............ 342/357.01, 342/357.06, 357.08, 357.13; 701/208, 213, 701/214
See application file for complete search history.

(56) References Cited

U.S. PATENT DOCUMENTS

| | | | | |
|---|---|---|---|---|
| 6,400,304 | B1 * | 6/2002 | Chubbs, III | 342/20 |
| 6,914,541 | B1 * | 7/2005 | Zierden | 340/937 |
| 7,389,198 | B1 * | 6/2008 | Dimitriadis | 702/142 |
| 2003/0052797 | A1 * | 3/2003 | Rock et al. | 340/936 |
| 2004/0107037 | A1 * | 6/2004 | Straub | 701/93 |

* cited by examiner

*Primary Examiner*—Dao L Phan
(74) *Attorney, Agent, or Firm*—Rosenberg, Klein & Lee

(57) ABSTRACT

A dynamic speed finding method to detect drive speed of a target, i.e., a speeding car, to serve as evidence in writing a traffic ticket is executed in the following steps: Step A: the position and speed of a speed finding object, i.e., a moving police car, are detected; Step B: the relative position and relative speed of the target are detected; Step C: the speed of the target is calculated; and Step D, the data of the speed of the target is stored.

4 Claims, 2 Drawing Sheets

DYNAMIC SPEED FINDING METHOD

BACKGROUND OF THE INVENTION (a) Field of the Invention

The present invention relates to dynamic speed finding method, and more particularly to one that finds the position and speed of a moving police vehicle using signals transmitted from GPS, the relative position and relative speed of a speeding car found with a range and speed finder mounted in the police vehicle to calculate a speed of the speeding car to enforce a ban on the vehicle driving against traffic regulations according to the calculated speed.

(b) Description of the Prior Art

To maintain driving safety and improve traffic condition, traffic control authorities will set speed limits at various spots depending on traffic flow and usually test finding units are erected to ban speeding by taking photos. Radar speed finders generally available in the market include USA specification, European specification and stationary photography system.

Usually radar has a wide angle of transmission that can't lock up a specific car in case of heavy traffic and it may easily attract disputes, while a laser system has a small angle of transmission to lock up a specific car. For the radar or laser speed finder, it must remain still while taking a photo of a speeding car and the included angle between the speeding car and the speed finder must be small enough to get correct speed value disregarding the speed finder is of stationary or hand-held type. There is a different type of a speed finder, such as the Autovelox 104/c2 made in Italy, that it finds the car speed by emitting two parallel beams of light, then included angle between the speeding car and the speed finder must be near 90°. Response time is another factor to be considered. Traffic police officer prefer that a speed finder, hand-held or mobile, is capable of finding a speeding car within a long range, then the speed finding system must be adapted with a telephoto lens when a photo is needed to clearly identify a license plate of a speeding car for writing a traffic ticket. Accordingly, the entire camera speed finding system adapted with the telephoto lens will become too heavy and is not easily portable. Furthermore, the telephoto lens has a narrow visual angle, so it is too sensitive to handle for mild vibration. Therefore, it is less efficient for the policeman to ban speeding violation.

A conventional bluetooth satellite positioning speed finder is comprised of a satellite positioning module to receive signals from GPS; a radar signal detection module to pick up frequency signal of radar wavelength emitted from a speed finding unit on the road; a data storage unit to store data of coordinates available from a stationery speed finding device; a microprocessor to process GPS signals, the frequency signal of the radar wavelength, and the data of coordinative; a tone broadcasting module to sound alarm according to a command given by the microprocessor; a display module to display status according to a command from the microprocessor; and a bluetooth module to transmit signals from the satellite positioning module and the tone broadcasting module to an electronic device provided with bluetooth function. Accordingly, a warning message is given to a driver of a speeding car to control driving speed to prevent from receiving a traffic ticket.

Other conventional devices take advantage of GPS to duck away from speeding regulation of police. Then a driver of a car adapted with the warning device to speed along without fears. Consequently, it makes even more difficult for the police to ban traffic violation.

SUMMARY OF THE INVENTION

The primary purpose of the present invention is to provide a dynamic speed finding method comprising the following steps: Step A, the position and speed of a speed finding object is detected using the GPS; Step B, the relative position and relative speed between the speed finding object and a target are detected; and Step C, the speed of the target is solved by the data of the position and speed of the speed finding object and the relative position and relative speed of the target.

Upon completing Step C, Step D may be further provided to store the speed of the target. Furthermore, the position of the target may be also stored.

The speed of the target is solved as follows:

$$|V2c(i)|=|[|V1(i)+\text{sign}[|P12c(i)|-|P12c(i-1)|]*|V12c(i)|]|$$

Wherein, $|V1(i)|$ is an absolute speed of the speed finding object in relation to the ground; $|V2c(i)|$, is the speed of the target along the moving direction of the speed finding object; $|P12c(i)|$ and $|P12c(i-1)|$; are the relative consecutive positions between the speed finding object and the target along the moving direction of the speed finding object; and $|V12c(i)|$, is the relative speed between the speed finding object and the target along the moving direction of the speed finding object.

A speed finding unit mounted to the speed finding object is a radar or laser speed finder.

The present invention provides the following efficacies:

1. It can be mounted to a police car on patrolling to provide speed finding to a speeding car while banning traffic violation of speeding to ensure of traffic safety and well facilitated traffic flow.

2. It can be implemented to calculate the speeding value with the above equation easily using two different devices, GPS and speed finder.

3. It takes photo showing the position and speed for the speeding violation of a car to serve evidence in regulating a speeding car.

DETAILED DESCRIPTION OF THE PREFERRED EMBODIMENTS

Figure 1:
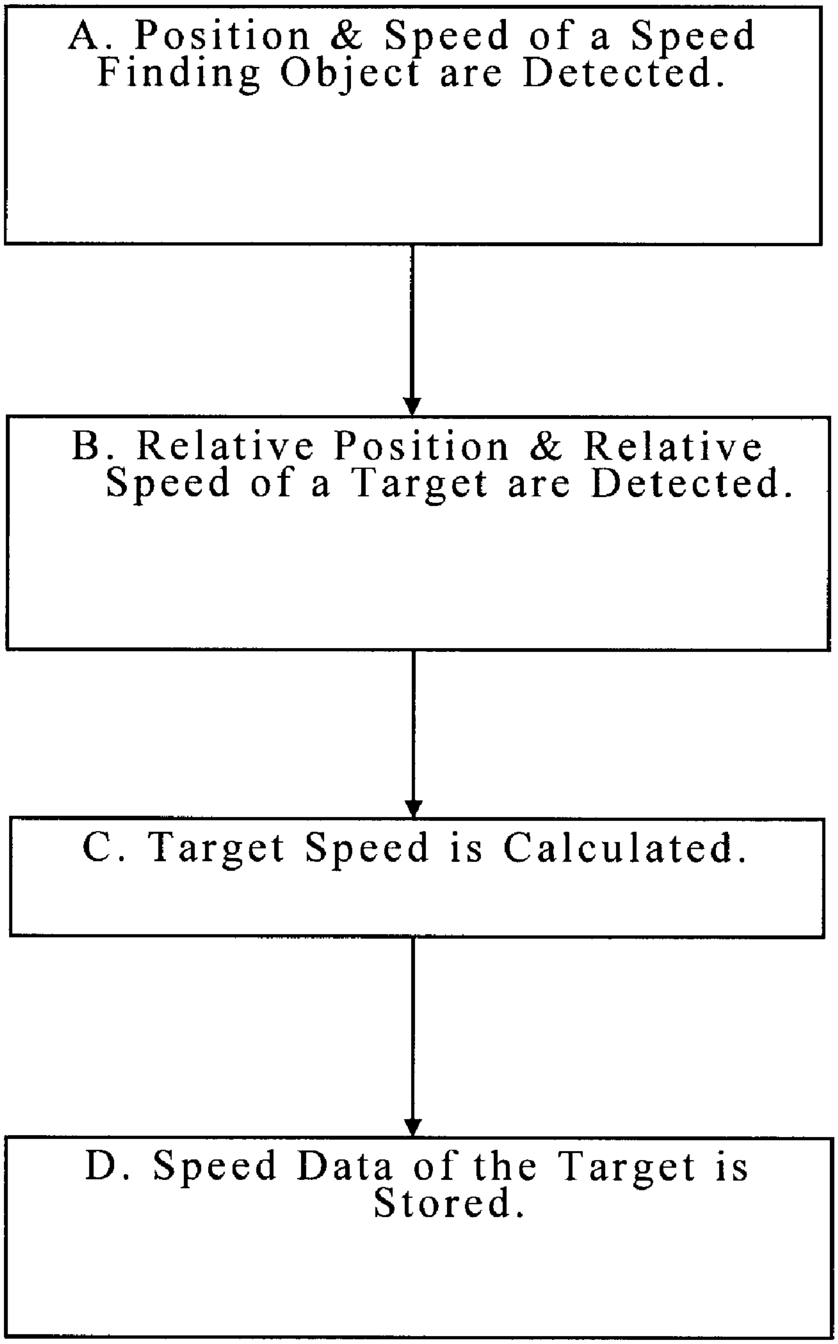
FIG. 1 is a flow path chart showing operation of the present invention.

Referring to FIG. 1, a dynamic speed finding method of the present invention is essentially comprised of the following steps:

Step A: finding the position and speed of a speed finding object—signals emitted from a Global Position System (GPS) are received to detect the position and speed of the speed finding object, i.e., a moving police vehicle;

Step B: finding the relative position and relative speed of a target—a speed finding unit mounted on the speed finding object detects the relative position and relative speed of the target, i.e., a car driving at a speed that may violate speed limit; and the speed finding unit may be a radar or laser speed finder to detect the relative position and relative speed between the speed finding object and the target;

Step C: calculating the speed of the target—a process unit is provided to solve the position and speed of the speed finding object and the relative position and relative speed of the target to further calculate the speed of the target; and Step D: storing data of the speed of the target—when the speed of the target is found exceeding the speed limit, a photography unit takes photos of the target and the system outputs related data for certification. Additionally the position of the target can automatically be recorded by the system for serving basis to regulate drive against traffic law.

To prove that the dynamic speed finding method of the present invention is feasible and reliable, the method is testified as follows:

Assuming that at a time of i−1, the speed finding object is located at P1(i−1) driving at a speed of V1(i−1), and a position P11 (i−1) and a speed of V11 (i−1) are detected by a GPS; therefore P11(i−1)=P1(i−1), V11(i−1)=|V1(i−1)|.

A position of a target is at P2(i−1) moving at a speed of V2(i−1), and V2(i−1) is a value of the target in relation to the ground to be solved; and the relative position and relative speed between the speed finding object and the target are respectively of P12(i−1) and V12(i−1).

Supposing that at a next moment "i", the speed finding object is located at P1(i) moving at a speed of V1(i), the position and speed of the speed finding object detected by the GPS are respectively of P11(i) and V11(i); therefore P11(i)= P1(i), and V11(i)=|V1(i)|.

The position of the target is at P2(i) moving at a speed of V2(i), wherein the V2(i) is a value of the target speed in relation to the ground to be solved; and the relative position and relative speed between the speed finding object and the target are respectively of P12(i) and V12(i).

It is solved according to vectors in kinetics:

$$P2(i-1)=P1(i-1)+P12(i-1) \quad (1)$$

$$V2(i-1)=V1(i-1)+V12(i-1) \quad (2)$$

$$P2(i)=P1(i)+P12(i) \quad (3)$$

$$V2(i)=V1(i)+V12(i) \quad (4)$$

When both moments are extremely close to each other, dt→0, DIR(x) is defined as a unit vector of x; and V1(i) and V2(i) can be defined as follows:

$$V1(i)\approx DIR[P1(i)-P1(i-1)]*|V1(i)| \quad (5)$$

$$V2(i) \approx [P2(i)-P2(i-1)]/dt = [[P1(i)+P12(i)]-[P1(i-1)+P12(i-1)]]/dt = [P1(i)-P1(i-1)]/dt + [P12(i)-P12(i-1)]/dt = DIR[P1(i)-P1(i-1)]*|V1(i)| + [P12(i)-P12(i-1)]/dt \quad (6)$$

moment of "i−1" are respectively of |P12c(i−1)| and |V12c (i−1)|; and a relative range and a relative rate detected at the moment of "i" are respectively of |P12c(i)| and |V12c(i)|; therefore, $$P12c(i)=DIR[P1(i)-P1(i-1)]*|P12c(i) \quad (7)$$

$$P12c(i-1)=DIR[P1(i)-P1(i-1)]*|P12c(i-1)| \quad (8)$$

As solved from formulate (6), (7), and (8)

$$V2c(i)=DIR[P1(i)-P1(i-1)]*[|V1(i)+(|P12c(i)|-|P12c(i-1)|)/dt] \quad (9)$$

It is further solved from Formula (4) and the assumptions that:

$$V2c(i) = DIR[V1(i)]*|V1(i)| + DIR[V12c(i)]*|V12c(i)| = DIR[P1(i)-P1(i-1)]*[|V1(i)|+|V12c(i)|]. \quad (10)$$

When $V12c(i)$ and $V1(i)$ are moving in the same direction:

$$= DIR[P1(i)-P1(i-1)]*[|V1(i)|-|V12c(i)|]$$

When V12c(i) and V1(i) are moving in opposite direction, formula (9) and (10) are compared to avail:

$$V2c(i)=DIR[P1(i)-P1(i-1)]*[|V1(i)|+\text{sign}\,[|P12c(i)|-|P12c(i-1)|]*|V12c(i)|] \quad (11)$$

Therefore, $$|V2c(i)|=|[|V1(i)|+\text{sign}[|P12c(i)|-|P12c(i-1)|]*|V12c(i)|]| \quad (12)$$

Wherein, |V1(i)| is an absolute speed of the speed finding object in relation to the ground, and the speed of the speed finding object is measured by the GPS.

|P12c(i)| and |P12c(i−1)| are the relative consecutive positions between the speed finding object and the target along the moving direction of the speed finding object measured by the speed finding unit (radar or laser speed finder), and |V12c(i)| is the relative speed between the speed finding object and the target along the moving direction of the speed finding object detected by the speed finding unit (radar or laser speed finder).

Figure 2:
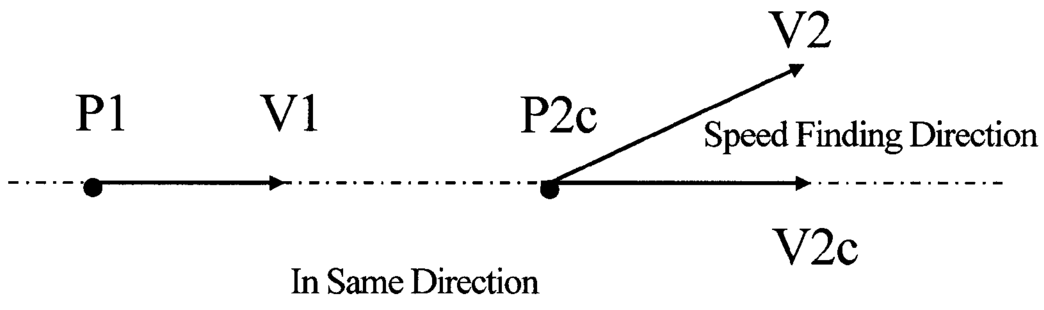
FIG. 2 is a schematic view showing movements of a speed finding object of the present invention and a speeding target.
Figure 2:
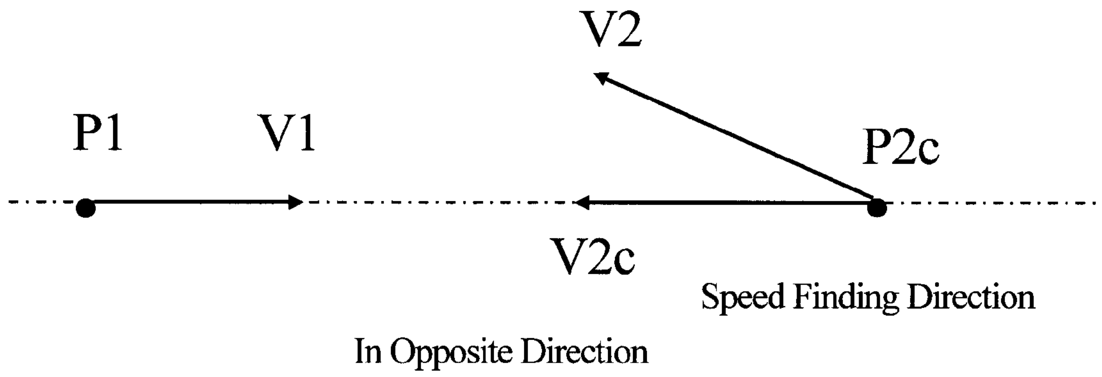

|V2(i)| is the absolute speed of the target in relation to the ground. When the speed finding object and the target are moving on a non-linear direction, a numeric value of |V2c(i)| is deemed as a cosign scale of the target in the moving direction of the speed finding object. Accordingly, the numeric value of |V2c(i)| solved by the system is smaller than or equal to the real speed of the target, |V2(i)|; and the numeric value To avail effective measurement data, a moving direction of the speed finding object and that of the target must be practically on a straight line as illustrated in FIG. 2 while both the speed finding object and the target may move in the same or opposite direction. Suppose that the speed finding unit is heading for the front of the target and the target is moving at where in front of the speed finding object; P2c(i) and V2c(i) are defined as a position and speed of the target moving along the moving direction of the speed finding unit; a relative range and a relative rate measured by the speed finding unit at the of |V2c(i)| is justified to become the basis to regulate a speeding car. The measured speed being slightly smaller than the real speed is because of the angle of cosign and the measured speed is used exclusively applied in regulating a speeding car since the fact that the measure speed being smaller than the real speed will not affect the act of regulating a speeding car.

Furthermore, when the speed finding object is in its still status, $$|V2c(i)|=|\mathrm{sign}[|P12c(i)|-|P12c(i-1)|]*[|V12c(i)|]|=|V12c(i)| \tag{13}$$

The result indicated by formula (13) is identical with that solved with conventional speed finder. Therefore the dynamic speed finding method of the present invention is applicable to a mobile or stationary speed finding device for regulating a speeding car.

What is claimed is:

1. A dynamic speed finding method comprising the following steps:

A. using Global Position System (GPS) to detect the position and speed of a speed finding object;

B. finding the relative position and relative speed of a target on the speed finding object; and C. solving the speed of the target by the position and speed of the speed finding object and the relative position and relative speed between the speed finding object and the target, wherein the speed of the target detected is solved by the following formula:

$$|V2c(i)|=|[|V1(i)|+\mathrm{sign}[|P12c(i)|-|P12c(i-1)|]*|V12c(i)|]|$$

wherein, the |V1(i)| is an absolute speed of the speed finding object in relation to the ground;

|V2c(i)| is the speed of the target along the moving direction of the speed finding object;

|P12c(i)| and |P12c(i−1)| are the relative consecutive positions between the speed finding object and the target along the moving direction of the speed finding object; and

|V12c(i)| is the relative speed between the speed finding object and the target along the moving direction of the speed finding object detected by a speed finding unit.

2. The dynamic speed finding method as claimed in claim 1, further comprising step D to store data of the speed of the target detected.

3. The dynamic speed finding method as claimed in claim 2, wherein the position of the target is further stored.

4. The dynamic speed finding method as claimed in claim 1, wherein the speed finding unit is a radar or laser speed finder.

* * * * *